(12) United States Patent
Aeling et al.

(10) Patent No.: US 7,198,372 B2
(45) Date of Patent: Apr. 3, 2007

(54) DUAL DISPLAY

(75) Inventors: Ellen O. Aeling, St. Paul, MN (US);
Paul L. Acito, St. Paul, MN (US);
Linden E. Brooks, III, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/750,332

(22) Filed: Dec. 31, 2003

(65) Prior Publication Data

US 2005/0140927 A1 Jun. 30, 2005

(51) Int. Cl.
| G03B 21/26 | (2006.01) |
| G03B 21/28 | (2006.01) |
| G03B 21/60 | (2006.01) |
| G03B 21/56 | (2006.01) |
| H04N 9/31 | (2006.01) |

(52) U.S. Cl. .................. 353/30; 353/99; 353/122; 359/453; 359/456; 359/460; 348/744

(58) Field of Classification Search .................. 353/30, 353/10, 31, 98, 99, 119, 122; 359/443, 453, 359/456, 460, 536; 348/739, 744, 745; 40/427, 40/443, 442, 615; 156/234, 239–241, 247, 156/252, 344

See application file for complete search history.

(56) References Cited

U.S. PATENT DOCUMENTS

| 3,183,772 A | 5/1965 | Fitzpatrick | |
| 4,673,609 A * | 6/1987 | Hill | 428/187 |
| 5,962,109 A | 10/1999 | Schwietz | |
| 6,030,687 A * | 2/2000 | Andriash | 428/138 |
| 6,212,805 B1 * | 4/2001 | Hill | 40/443 |
| 6,242,076 B1 | 6/2001 | Andriash | |
| 6,254,711 B1 | 7/2001 | Bull et al. | |
| 6,417,966 B1 | 7/2002 | Moshrefzadeh et al. | |
| 6,507,413 B1 | 1/2003 | Mueller et al. | |
| 6,519,087 B2 | 2/2003 | Moshrefzadeh | |
| 6,567,215 B2 | 5/2003 | Ballen et al. | |
| 2001/0006714 A1 | 7/2001 | Bull et al. | |
| 2002/0034608 A1 | 3/2002 | Aeling et al. | |
| 2002/0080484 A1 | 6/2002 | Moshrefzadeh et al. | |
| 2002/0163719 A1 | 11/2002 | Ma et al. | |
| 2002/0163722 A1 * | 11/2002 | Gehring et al. | 359/460 |
| 2003/0053207 A1 | 3/2003 | Ballen | |

FOREIGN PATENT DOCUMENTS

| EP | 0 041 390 | 9/1981 |
| FR | 2 702 296 A3 | 9/1993 |
| JP | 03 243932 | 10/1991 |
| NL | A 9401568 | 5/1996 |
| WO | WO 99/13378 | 3/1999 |

* cited by examiner

Primary Examiner—W. B. Perkey
Assistant Examiner—Rochelle Blackman
(74) Attorney, Agent, or Firm—Colene H. Blank

(57) ABSTRACT

A dual display system includes a graphic article providing a first display in a first lighting condition (such as daylight) and a projection system providing a second display in a second lighting condition (such as nighttime). In an exemplary embodiment, the graphic article is a perforated imaged film and the projection system includes a projector and a diffuser screen.

27 Claims, 5 Drawing Sheets

DUAL DISPLAY

BACKGROUND OF THE INVENTION

The present invention relates to a dual display, and more particularly to a dual display having an imaged perforated film for viewing a first image in a first lighting condition and a projection/diffusion system for viewing a second image or series of images in a second lighting condition.

Advertisers and merchants desire the ability to display graphic and/or informational images on a wide variety of surfaces. In recent years, transparent surfaces such as windows, walls and the like have attracted a great deal of attention as substrates for advertising media. In some applications, graphic images applied to transparent substrates are visible when viewed from one side of the substrate, while leaving the substrate substantially transparent when viewed from the other side of the substrate.

Graphic articles achieving this effect are typically multilayer films having an opaque (light colored, usually white) film adapted to receive an image on one surface and light absorbing (dark colored, usually black) film or ink applied to the opposite surface. A pressure sensitive adhesive and removable backing, or carrier, material is applied to the dark film or ink, which allows the printed graphic to be handled and applied to a window.

Numerous perforations through the film layers create an optical illusion of "transparency" through the graphic article. The perforations are sized and spaced such that, when observed from the imaged side, a viewer has a tendency to see the image. However, when observed from the relatively darker side, the viewer has a tendency to see through the graphic article, leaving their view unobstructed. In addition, it is well known that windows appear dark or opaque when viewed from an area of relatively bright ambient light into a relatively darker area. When viewed from an area of relatively dark ambient light into a relatively brighter area, the windows appear transparent. The unidirectional effect of the graphic article is enhanced by this effect, which allows viewers in relatively darker areas, such as the interiors of vehicles and buildings, to see through the unidirectional graphic article, while viewers in relatively brighter ambient light will see the printed graphic.

The design and production of a unidirectional graphic article is described in detail in U.S. Pat. No. 6,254,711 entitled "Method for Making Unidirectional Graphic Article" and assigned to the same assignee as the instant application. U.S. Pat. No. 6,254,711 is hereby incorporated by reference in its entirety.

While unidirectional graphic articles are quite useful in a number of display environments, these articles typically provide only one display option in a first lighting condition, and a non-display (transparent) viewing option in a second lighting condition. That is, an image can be seen (from the viewing side of the article) in high brightness conditions such as daylight, and the image is not visible (from the viewing side of the article) in low brightness conditions such as nighttime. Additional, more versatile display systems would also be useful in the art.

BRIEF SUMMARY OF THE INVENTION

The present invention is a dual display system that includes a graphic article providing a first display in a first lighting condition (such as daylight) and a projection system providing a second display in a second lighting condition (such as nighttime). In an exemplary embodiment, the graphic article is a perforated imaged film and the projection system includes a projector and a diffusion screen.

While the above-identified drawings set forth several exemplary embodiments, other embodiments of the present invention are also contemplated, as noted in the discussion below. This disclosure presents illustrative embodiments of the present invention by way of representation and not limitation. Numerous other modifications and embodiments can be devised by those skilled in the art which fall within the scope and spirit of the principles of this invention.

DETAILED DESCRIPTION

Figure 1:
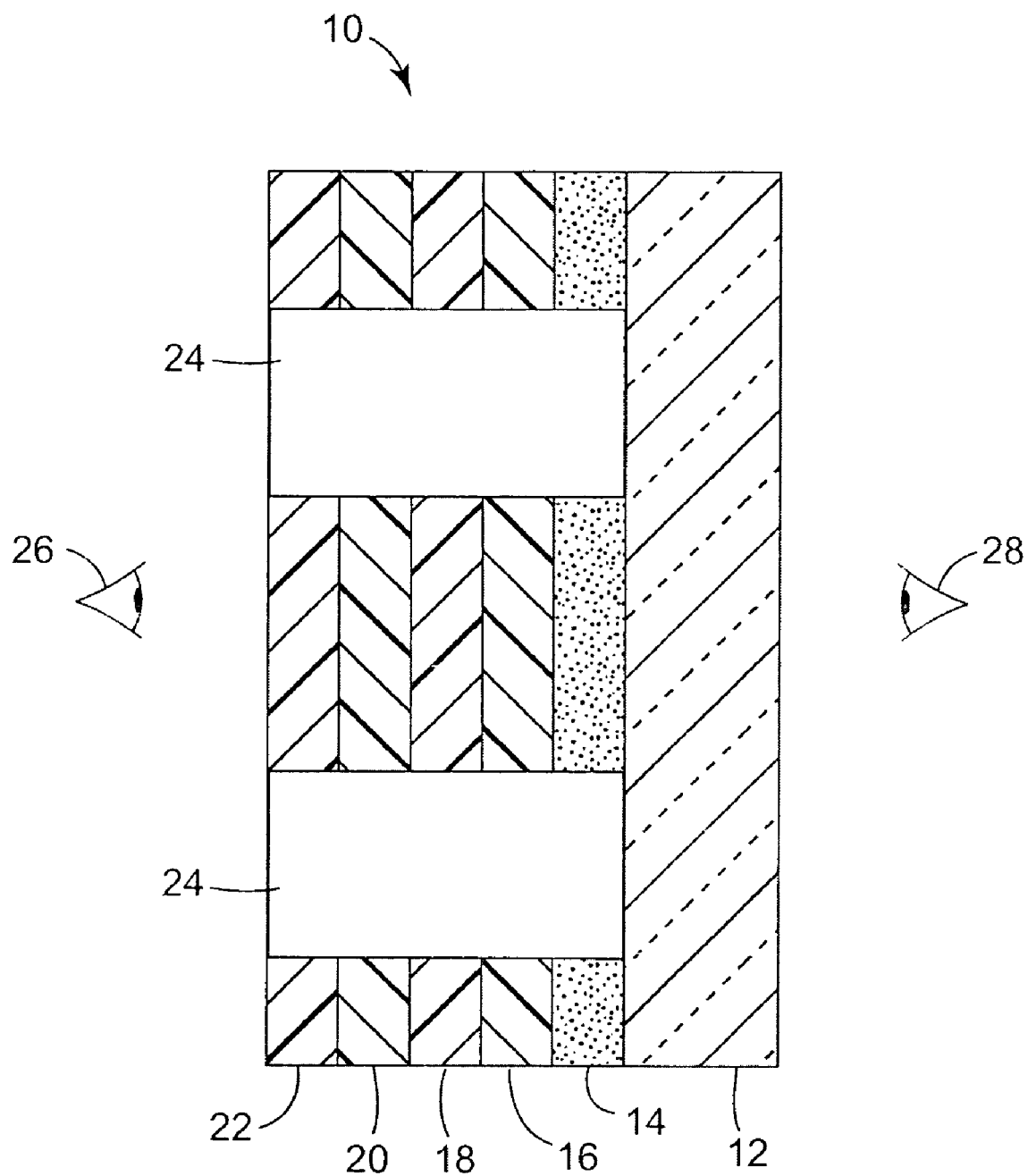
FIG. 1 is a diagram illustrating an exemplary prior art unidirectional graphic article.

FIG. 1 is a diagram illustrating exemplary prior art unidirectional graphic article 10, such as is manufactured by 3M Corporation of St. Paul, Minn. Products are manufactured by 3M Corporation under various "Perforated Window Graphic Film" trade names, including 8671, 8674, 8174, RG8171 and IJ8171. Article 10 is shown in FIG. 1 as being adhered to transparent substrate 12, such as a window, and includes adhesive layer 14, imageable film layer 16, image layer 18, and pigment layers 20 and 22. Apertures 24 extend through the layers of article 10, and are spaced in such a way that viewer 26 sees through article 10 and transparent substrate 12, while viewer 28 sees the image formed on image layer 18. A detailed description of the construction of article 10 may be found in U.S. Pat. No. 6,254,711, which has been incorporated herein by reference. As is disclosed in U.S. Pat. No. 6,254,711, apertures 24 typically occupy between about 10% and 70% of the surface area of the imaged layer of the article.

Figure 2:
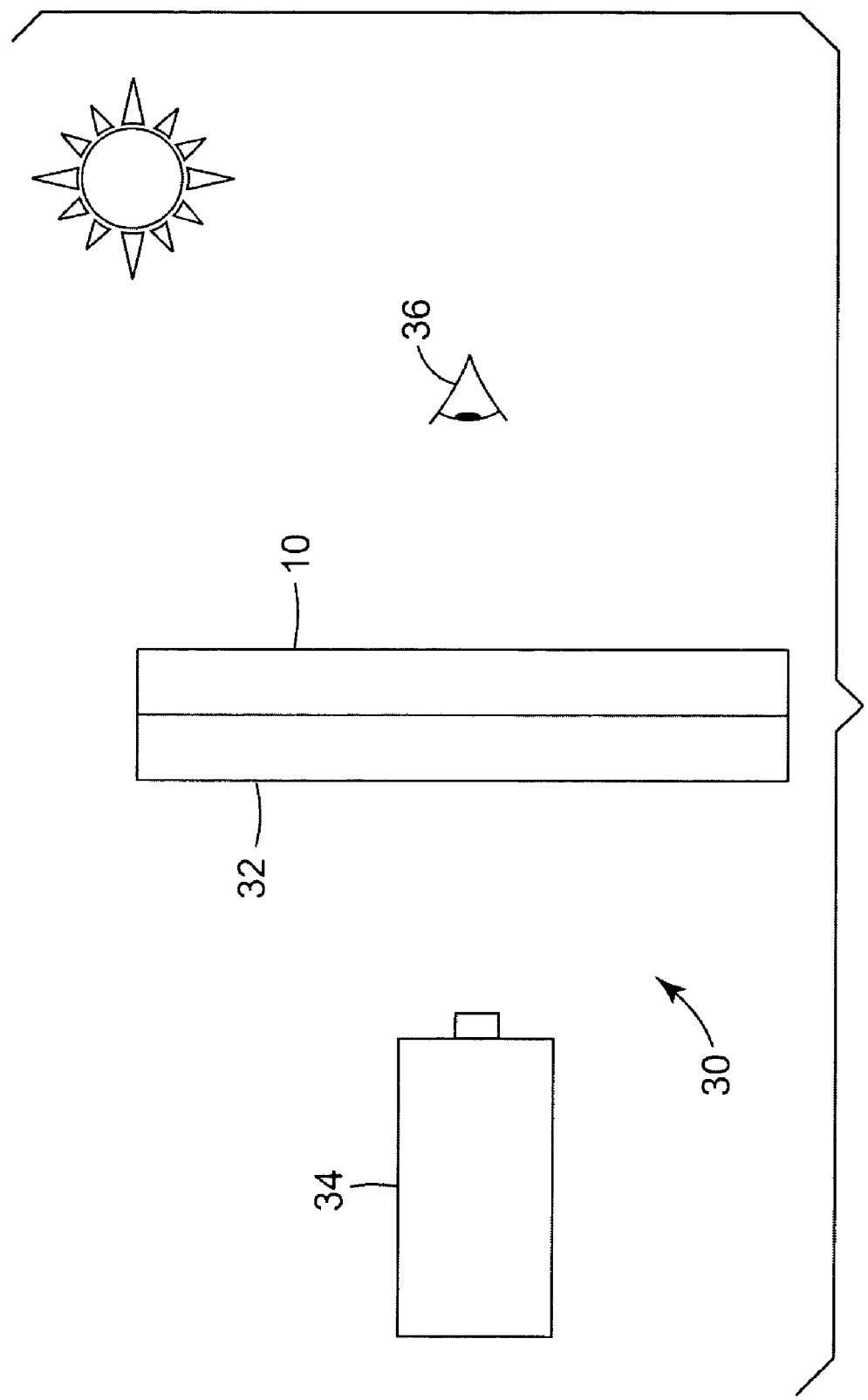
FIG. 2 is a diagram illustrating a dual display system configured according to an exemplary embodiment of the present invention.

FIG. 2 is a diagram illustrating a dual display system including dual display article 30 configured according to an exemplary embodiment of the present invention. Dual display article 30 is made up of unidirectional graphic article 10 and diffuser screen 32. In an exemplary embodiment, unidirectional graphic article 10 is configured generally in the manner described above with respect to FIG. 1, having an image that is viewable by viewer 36 and which provides a first display. Alternatively, a light restricting silhouette pattern article may be employed as the graphic article, configured as described in U.S. Pat. No. 6,507,413 assigned to the same assignee as the instant application, which is hereby incorporated by reference. Diffuser screen 32 is configured in a manner known in the art to receive a projected image or series of images from projector 34 and to display those images for viewing by viewer 36, providing a second display. A number of possible diffuser screen designs and configurations are available. For example, suitable diffuser screens are manufactured by 3M Corporation of St. Paul, Minn., under the trade names 3M Diffuser Films 3635-70 and 3635-30. In addition, any of the rear projection screens disclosed in U.S. Pat. No. 6,417,966 (a rear projection screen using internal reflection), U.S. Pat. No. 6,519,087 (a rear projection screen employing refracting beads) and U.S. Pat. No. 6,567,215 (a rear projection screen having tunable performance by employing a mixture of multiple types of microbeads), U.S. Patent Application Publication Nos. 2002/0080484A1 (a microstructured rear projection screen employing tapered waveguides) and 2002/0163719A1 (a projection screen having multiple polymeric materials for asymmetric light scattering), and PCT Publication No. WO99/13378 (a rear projection display employing a polarization sensitive beam splitter) (all assigned to the same assignee as the instant application) would be suitable to use for the design of diffuser screen 32. U.S. Pat. Nos. 6,417,966, 6,519,087 and 6,567,215, U.S. Patent Application Publication Nos. 2002/0080484A1 and 2002/0163719A1, and PCT Publication No. WO99/13378 are hereby incorporated by reference in their entirety. Other diffuser screen configurations are also known to those skilled in the art, such as adhesive coated diffuser films, translucent films which may be with or without an adhesive layer, rigid plastic diffusers, various beaded screens, frosted glass, and others. Diffuser screens having transmission of about 20–90% are able to be employed in the dual display system described herein.

The deployment of unidirectional graphic article 10 and diffuser screen 32 with projector 34 provides a dual display system that provides a first display, showing a first image (imaged on unidirectional graphic article 10) to viewer 36 in a first lighting condition, and that provides a second display, showing a second image or series of images (projected and focused onto diffuser screen 32 by projector 34) to viewer 36 in a second lighting condition. More precisely, in a first lighting condition when conditions are brighter on the side of unidirectional graphic article 10 where viewer 36 is positioned, and dimmer on the side of unidirectional graphic article 10 opposite viewer 36 (such as in daylight conditions), the first image is visible. Under these conditions, the first image therefore provides a first display. In a second lighting condition, when conditions are dimmer on the side of unidirectional graphic article 10 where viewer 36 is positioned, and brighter on the side of unidirectional graphic article 10 opposite viewer 36 (such as nighttime conditions), the first image is not visible. Thus, in the second lighting condition, the image projected by projector 34 and focused onto diffuser screen 32 is visible to viewer 36 through unidirectional graphic article 10, and thus provides a second display. In one embodiment, the first lighting condition is provided by daylight on the exterior of a window substrate and the second lighting condition is provided by projector 34 projecting an image or series of images onto diffuser screen 32 that is brighter than the ambient light conditions on the side of unidirectional graphic article 10 where viewer 36 is positioned.

Generally, projector 34 projects an image onto (and through) diffuser screen 32. The image projected by projector 34 is focused in the plane of diffuser screen 32. The image projected by projector 34 is visible in the second lighting condition through the apertures of unidirectional graphic article 10 in order to provide a second display.

As briefly described above, dual display article 30 may employ a unidirectional graphic article having perforation between 10% and 70%, and may employ a diffuser screen having transmission between 20% and 90%. More preferably, the unidirectional graphic article has a perforation between 40% and 50%, and the diffuser screen has a transmission between 50% and 70%. Most preferably, the unidirectional graphic article has a perforation of about 40% and the diffuser screen has a transmission of about 60%. One skilled in the art will recognize that the percentages listed are approximate (and include a tolerance of about plus/minus 3%), and are given to inform the skilled artisan of the types of performance parameters that are usable in various embodiments of dual display article 30.

The versatility afforded by the dual active display system shown in FIG. 2 provides the opportunity for use in a number of different applications. Advertising is an exemplary application in which the dual active display system may be particularly useful. For daylight viewing, an image (providing a first display) may be provided on unidirectional graphic article 10 which represents information about a particular sale that is running in the store, products that are currently available in the store, or other information that is particularly pertinent to a consumer during a time while the store is open for business, for example. At night, perhaps when the store is not open for business, an image or series of images may be projected onto diffuser screen 32 by projector 34, providing a second display. This image or series of images may present information that is more pertinent to a consumer during times other than business hours, such as a listing of store hours, advertisements related to the store's product lines, or other information that may draw the consumer to return to the store another time. In a nighttime setting where the store is open for business, the image or images may serve to draw customers into the store. These images may be fixed images, a series of fixed images, or a full motion video, and in an exemplary embodiment projector 34 is computer controlled.

The combination of a unidirectional graphic article and a projection screen display provides a number of advantages over a simple projection display. In theory, a projection screen display can be programmed to display a certain type of information during the day and another type of information at night. However, projection displays are often difficult to see in high brightness conditions such as daylight. These displays are typically either not effective during daylight conditions, or must employ high power usage to overcome the ambient brightness of daylight conditions. A more cost-effective and attractive display during the day is achieved by employing a unidirectional graphic article in front of the projection display diffuser, which provides a fixed display during high brightness conditions and allows the projection display to be seen during low brightness conditions, when it is most attractive and effective. The ability to display different images during different brightness conditions may be useful for a number of other applications as well.

The control of projector 34 may take a variety of forms. Projector 34 may be controlled by a computer to display a static image, a series of images or slides, or a full motion video, for example. These displays may be initiated by a timer, so that they are shown at a particular time of day, or may simply be continually displayed so that they are visible through unidirectional graphic article 10 only during certain lighting conditions. Another option for controlling the timing of operating projector 34 is to employ one or more photocells to sense the difference between the brightness of light on opposite sides of unidirectional graphic article 10. The control of projector 34 could also be such that the image projected and focused onto diffuser screen 32 registers and interleaves with the image shown on unidirectional graphic article 10 to provide a combined display as the lighting conditions transition from the first lighting condition (brighter on the viewer side) to the second lighting condition (brighter on the projector side) and vice versa. Other options for the control of projector 34 are also contemplated within the scope and spirit of the present invention. For example, in another embodiment, an additional projector may be positioned on the same side of dual display article 30 as viewer 36 to project a first display (comprising an image, a series of images, or a full motion video) that is focused onto unidirectional graphic article 10, with coordinated control between projector 34 and the additional projector to provide more complex images and/or videos to the viewer.

Figure 3:
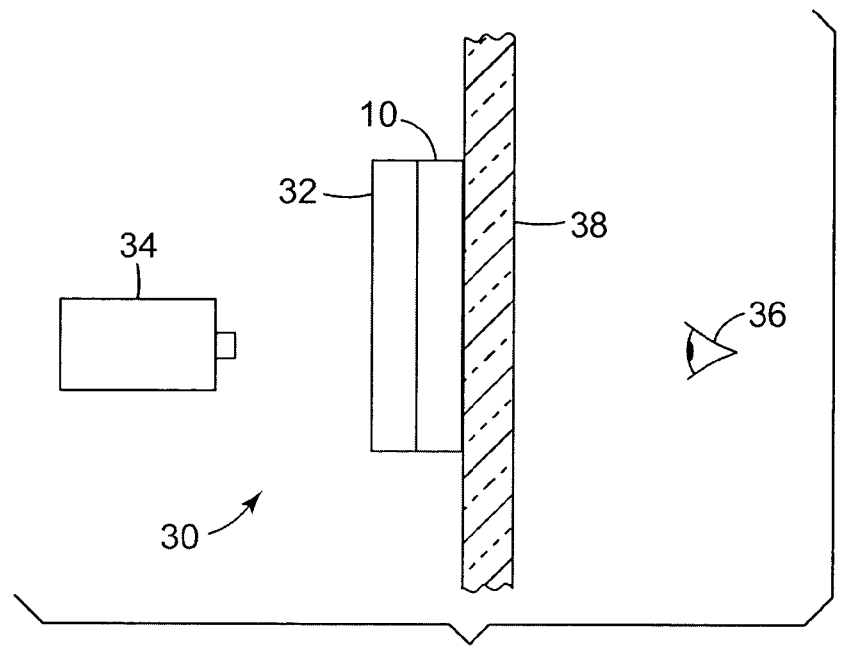
FIG. 3 is a diagram illustrating a first exemplary configuration of a dual display article.

FIG. 3 is a diagram illustrating a first exemplary configuration of dual active display article 30. The embodiment shown in FIG. 3 has unidirectional graphic article 10 attached to an inside surface of transparent window substrate 38. Diffuser screen 32 is attached behind article 10. In this embodiment, all of the components of dual active display article 30 are located on the inside of window substrate, providing protection from the elements or other potentially damaging instrumentalities (such as ultraviolet radiation, vandalism or other physical damage) that may be present outside window substrate 38.

Figure 4:
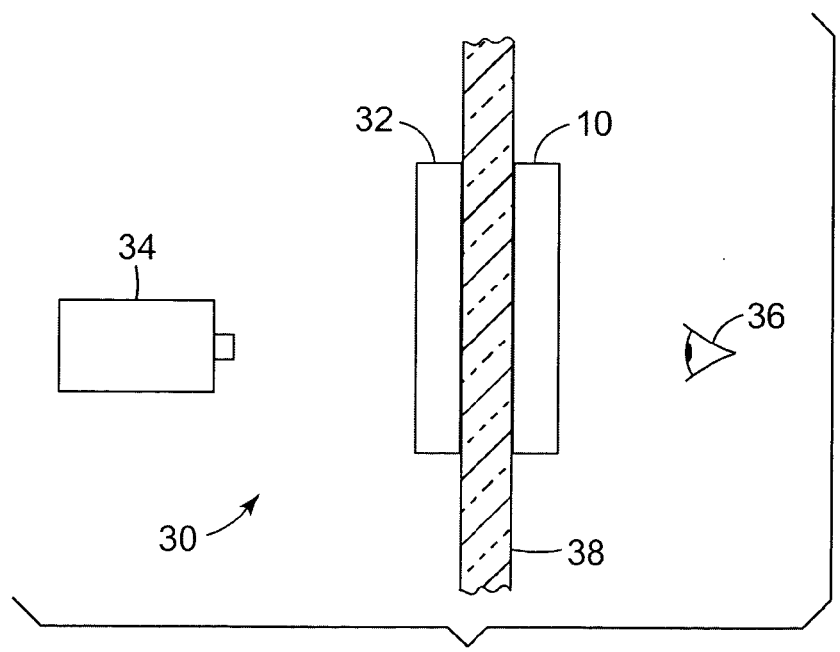
FIG. 4 is a diagram illustrating a second exemplary configuration of a dual display article.

FIG. 4 is a diagram illustrating a second exemplary configuration of dual active display article 30. The embodiment shown in FIG. 4 has unidirectional graphic article 10 attached to an outside surface of window substrate 38. Diffuser screen 32 is attached to an inside surface of window substrate 38. In this embodiment, unidirectional graphic article 10 and diffuser screen 32 are separate components that may be changed or replaced independently. This can be advantageous in a situation where it is desirable to periodically change the image displayed by unidirectional graphic article 10. Diffuser screen 32 does not require replacement very often, and can be left unchanged when unidirectional graphic article 10 is replaced.

Figure 5:
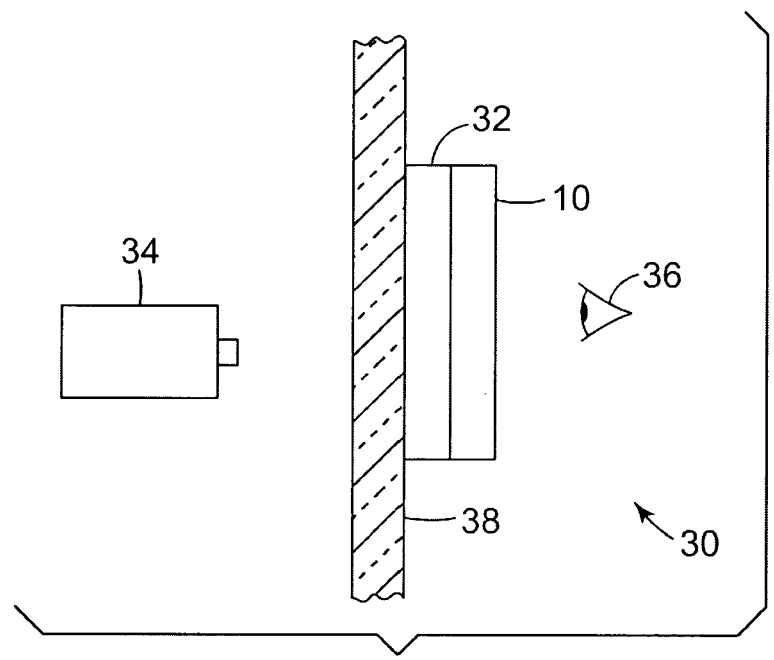
FIG. 5 is a diagram illustrating a third exemplary configuration of a dual display article.

FIG. 5 is a diagram illustrating a third exemplary configuration of dual active display article 30. The embodiment shown in FIG. 4 has diffuser screen 32 attached to an outside surface of window substrate 38. Unidirectional graphic article 10 is attached to diffuser screen 32 opposite window substrate 38.

Figure 6:
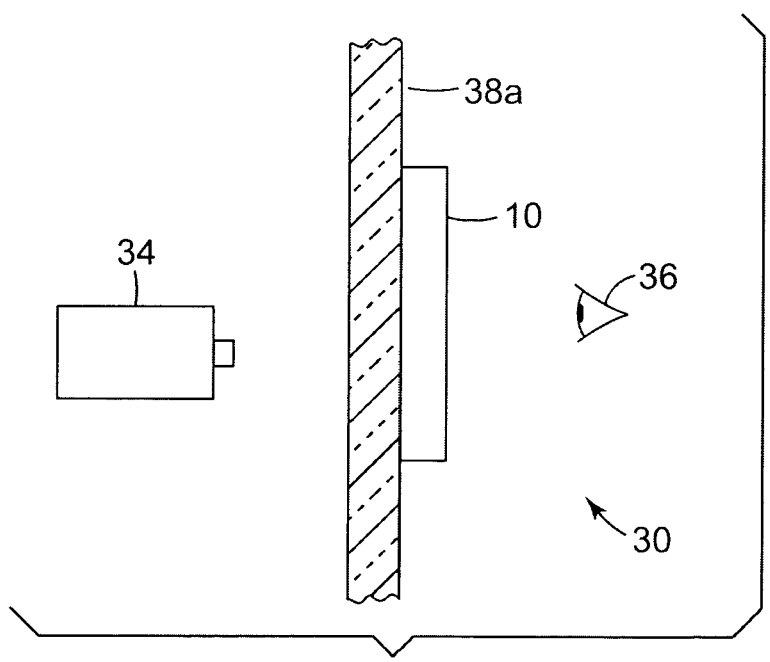
FIG. 6 is a diagram illustrating a fourth exemplary embodiment of a dual display article.

FIG. 6 is a diagram illustrating a fourth exemplary configuration of dual active display article 30. The embodiment shown in FIG. 4 has unidirectional graphic article 10 attached to an outside surface of window substrate 38a. Window substrate 38a is composed of a diffusing material, such as milky or translucent plexiglass in an exemplary embodiment, to act as the diffuser screen for an image projected and focused thereupon by projector 34.

Figure 7:
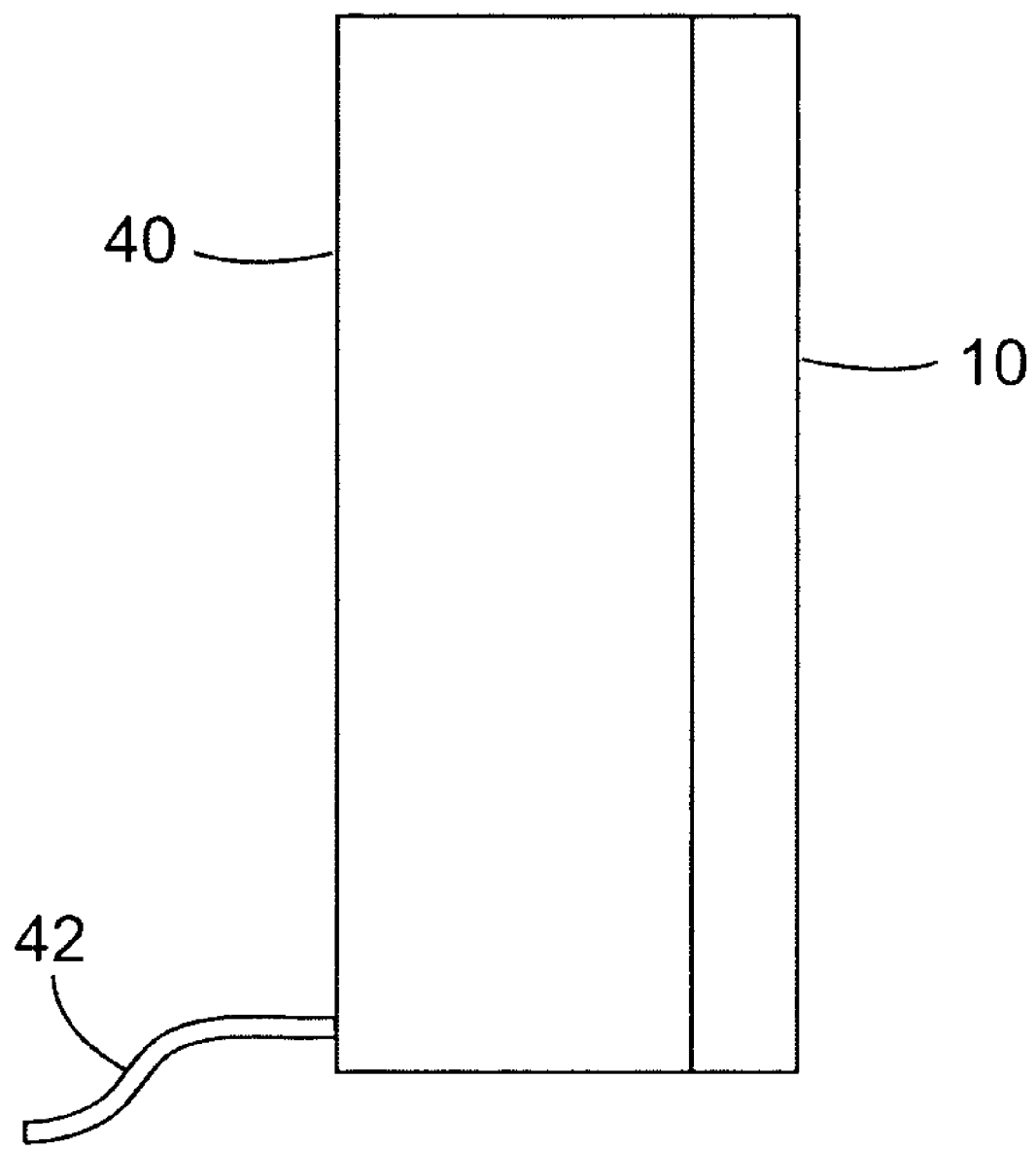
FIG. 7 is a diagram of an alternate embodiment of a dual display article.

FIG. 7 is a diagram of an alternate embodiment of a dual display article, which employs a television or computer display 40 (powered such as through cord 42) as the projection system to provide a projected image, with unidirectional graphic article 10 attached to the front surface of television display 40. In this embodiment, a first display is provided by the image on unidirectional graphic article 10 and a second display is provided by the projected image provided by television or computer display 40. Exemplary versions of display 40 may be an LCD display, a plasma screen television, or any number of other suitable displays to which unidirectional graphic article 10 may be affixed. This embodiment is likely to be more expensive to implement than the previously described embodiments, particularly for a large display, but does illustrate another potential use of the concepts and principles of the present invention.

The dual active display system described herein provides a versatile display in which a first image is viewable in a first lighting condition and a second image or series of images is viewable in a second lighting condition. In an exemplary embodiment, a unidirectional graphic article (such as a perforated film) displays the first image in high brightness conditions, and is transparent in low brightness conditions. A projection system and diffuser operate to display the second image or series of images during low brightness conditions, viewable through the unidirectional graphic article during those conditions. As a result, effective and attractive images are viewable during all brightness conditions, and those images can be selected to be different as brightness conditions change.

EXAMPLE

The configuration described above with respect to FIG. 4 was constructed to test the ability of the dual display article to clearly display images in different lighting conditions. Various percentages of perforation (the percentage of the area of unidirectional graphic article 10 that is punched with apertures) and diffuser transmissions (the percentage of light transmitted by diffuser screen 32) were subjectively tested to determine what combinations would be effective. The subjective tests revealed that a perforation between 10% and 70% of the area of unidirectional graphic article 10 were effective, and that diffuser transmissions between 20% and 90% were effective. Subjective tests also revealed that a perforation of about 40% and a diffuser transmission of about 60% provided the best viewing characteristics. These characteristics (40% perforation and 60% diffusion) were obtained by employing Scotchcal™ Perforated Window Graphic Film 8174-10 White/Black manufactured by 3M Corporation as unidirectional graphic article 10, and by employing Diffuser Film 3635-70 manufactured by 3M Corporation as diffuser screen 32. Projector 34 was positioned about six feet from diffuser screen 32 in the embodiment tested, although greater distances up to about twelve feet are also possible, and the projected image was focused onto diffuser screen 32.

Although the present invention has been described with reference to preferred embodiments, workers skilled in the art will recognize that changes may be made in form and detail without departing from the spirit and scope of the invention.

The invention claimed is:

1. A dual display system having first and second opposite sides, the dual display system comprising:
    a graphic article providing a first display on the first side of the dual display system in a first lighting condition; and
    a projection system providing a projected image, series of images or full motion video from the second side of the dual display system to provide a second display on the first side of the dual display system in a second lighting condition.

2. The dual display system of claim 1, wherein the graphic article is a unidirectional graphic article.

3. The dual display system of claim 2, wherein the graphic article is a perforated imaged film.

4. The dual display system of claim 1, wherein the first lighting condition is a high brightness viewing condition and the second lighting condition is a low brightness viewing condition.

5. The dual display system of claim 1, wherein the projection system comprises a projector and a diffuser screen.

6. The dual display system of claim 5, wherein the projector is computer controlled.

7. The dual display system of claim 5, wherein the graphic article is attached to an inside surface of a window substrate and the diffuser screen is attached between the graphic article and the projector.

8. The dual display system of claim 5, wherein the graphic article is attached to an outside surface of a window substrate and the diffuser screen is attached to an inside surface of the window substrate.

9. The dual display system of claim 5, wherein the diffuser screen is a diffusing window substrate and the graphic article is attached to an outside surface of the window substrate.

10. The dual display system of claim 1, wherein the projection system is a television/computer display.

11. The dual display system of claim 1, wherein the second display provided by the projection system is at least one fixed image.

12. The dual display system of claim 1, wherein the second display provided by the projection system is a full motion video.

13. The dual display system of claim 1, wherein the first display conveys information relevant to a time period associated with the first lighting condition and the second display conveys information relevant to a time period associated with the second lighting condition.

14. A dual display article for attachment to a window substrate, comprising:
    a graphic article providing a first display viewable from a first direction in a high brightness condition; and
    a diffuser screen attached to the graphic article for receiving and displaying a projection from a second direction opposite the first direction to provide a second display viewable from the first direction in a low brightness condition.

15. The dual display article of claim 14, wherein the graphic article is a unidirectional graphic article.

16. The dual display article of claim 15, wherein the graphic article is a perforated imaged film.

17. The dual display article of claim 16, wherein the graphic article has a perforation of 10%–70% and the diffuser screen has a transmission of 20%–90%.

18. The dual display article of claim 17, wherein the graphic article has a perforation of about 40%–50% and the diffuser screen has a transmission of about 50%–70%.

19. The dual display article of claim 18, wherein the graphic article has a perforation of about 40% and the diffuser screen has a transmission of about 60%.

20. The dual display article of claim 14, wherein the high brightness condition is daylight and the low brightness condition is nighttime.

21. The dual display article of claim 14, wherein the graphic article is attachable to an inside surface of the window substrate and the diffuser screen is attached to the graphic article opposite from the window substrate.

22. A method of displaying multiple images in different lighting conditions, comprising:
    attaching a perforated image film bearing a first display to a first side of a transparent substrate, the first display being visible by a viewer viewing from the first side in a first lighting condition;
    attaching a diffuser screen to a second side of the transparent substrate opposite the first side of the transparent substrate; and
    projecting a second display through the diffuser screen, the second display being visible by a viewer viewing from the first side in a second lighting condition.

23. The method of claim 22, wherein the first lighting condition is a high brightness condition and the second lighting condition is a low brightness condition.

24. The method of claim 22, wherein projecting the second display through the diffuser screen is performed by a computer controlled projector.

25. The method of claim 22, wherein projecting the second display through the diffuser screen is performed by a television/computer display.

26. The method of claim 22, wherein the second display is at least one fixed image.

27. The method of claim 22, wherein the second display is a full motion video.

* * * * *